US008843161B2

(12) United States Patent
Kirik et al.

(10) Patent No.: US 8,843,161 B2
(45) Date of Patent: Sep. 23, 2014

(54) SYSTEM AND METHOD TO FACILITATE IN-APPLICATION PURCHASES ON MOBILE DEVICES

(71) Applicant: Fortumo OÜ, Tartu (EE)

(72) Inventors: Harri Kirik, Tartu (EE); Tauno Talimaa, Tartu (EE); Andrei Dementjev, Tartu (EE); Madis Pink, Tartu (EE); Tanel Kosk, Tartu (EE); Rain Rannu, Tartu (EE)

(73) Assignee: Fortumo OÜ, Tartu (EE)

( * ) Notice: Subject to any disclaimer, the term of this patent is extended or adjusted under 35 U.S.C. 154(b) by 3 days.

(21) Appl. No.: 13/686,559

(22) Filed: Nov. 27, 2012

(65) Prior Publication Data
US 2013/0137405 A1 May 30, 2013

Related U.S. Application Data

(60) Provisional application No. 61/563,792, filed on Nov. 27, 2011, provisional application No. 61/563,794, filed on Nov. 27, 2011, provisional application No. 61/563,797, filed on Nov. 27, 2011.

(51) Int. Cl.
H04W 24/00 (2009.01)
H04M 3/42 (2006.01)
H04M 11/00 (2006.01)
G06Q 30/00 (2012.01)
H04W 4/00 (2009.01)
H04W 8/18 (2009.01)

(52) U.S. Cl.
CPC ................... *H04W 8/183* (2013.01); *H04W 4/003* (2013.01)
USPC .................... 455/456.3; 455/406; 455/414.1; 705/26.81; 705/27.1

(58) Field of Classification Search
USPC ........ 455/410–411, 456.3, 406, 414.1–414.2, 455/456.1–457; 705/40, 14.1–14.39, 705/26.1–27.2
See application file for complete search history.

(56) References Cited

U.S. PATENT DOCUMENTS

| 2002/0111879 | A1* | 8/2002 | Melero et al. ............... 705/26 |
| 2006/0156052 | A1* | 7/2006 | Bodnar et al. ............... 714/2 |
| 2007/0063015 | A1* | 3/2007 | Mebruer ...................... 235/379 |
| 2007/0101352 | A1* | 5/2007 | Rabina et al. ................ 725/1 |
| 2007/0299780 | A1* | 12/2007 | Vanska et al. ............... 705/59 |
| 2011/0106709 | A1* | 5/2011 | Puura et al. ................. 705/64 |
| 2011/0137797 | A1* | 6/2011 | Stals et al. .................. 705/44 |

(Continued)

Primary Examiner — Michael Mapa
(74) Attorney, Agent, or Firm — Patent Law Offices of Michael E. Woods; Michael E. Woods

(57) ABSTRACT

System and method to facilitate purchases through mobile communications on various types of mobile devices and platforms by reducing the number of steps it takes the user to complete the purchase with mobile in-app payments, and/or by enabling purchases to be made without the device being connected to the Internet and/or by automatic compilation of payment request. A set of user identifying details, including user's country, mobile carrier name and phone number, is required in order to process a mobile purchase. The advantages of the present invention from the user perspective is the ability to complete the purchase in fewer steps by automatic user details identification and the ability to complete the purchase in case there is no Internet connection by embedding a specially formatted database file with the application of mobile device.

17 Claims, 7 Drawing Sheets

(56) References Cited

U.S. PATENT DOCUMENTS

| | | | |
|---|---|---|---|
| 2011/0258247 A1* | 10/2011 | Gordon | 709/202 |
| 2011/0258249 A1* | 10/2011 | Biggs et al. | 709/203 |
| 2012/0047146 A1* | 2/2012 | Balakrishnan et al. | 707/748 |
| 2012/0290440 A1* | 11/2012 | Hoffman et al. | 705/26.62 |

* cited by examiner

SYSTEM AND METHOD TO FACILITATE IN-APPLICATION PURCHASES ON MOBILE DEVICES

FIELD OF INVENTION

The present invention relates to the field of mobile payments, more specifically to the field of systems and methods for facilitating purchases by automatic Mobile Network Code, Mobile Country Code and MSISDN detection and/or by enabling purchases without active Internet connection and/or by automatic compilation of payment request.

BACKGROUND OF THE INVENTION

It is known to perform purchases of goods or services using a mobile device. For example, a user may purchase a song while browsing a mobile website. Or pay for additional content inside mobile game or application. There are various methods and technologies, that allow a user to perform purchases on a mobile device, including but not limited to those provided by mobile operating system manufacturer, handset vendors, mobile carriers and banks. Existing payment methods and technologies share common disadvantages.

Processing purchases on mobile device requires collecting extensive user details including but not limited to country, name of mobile carrier and mobile phone number of the user, in order to definitely validate that the purchase is authorized by device owner. As a result, payment process is complicated and consists of several time-consuming steps and users often abandon the payment.

From another perspective existing methods and technologies for purchases on mobile devices heavily rely on availability of Internet connection in order to process the purchase. As a result, user is not able to complete purchases on mobile devices without an Internet connection, for example while commuting, on roaming or in bad network reception area.

Some of existing solutions for enabling purchases on mobile devices using mobile carrier billing platforms require the user to manually compile payment request using SMS text message. This is a time-consuming process and many users make errors in request or abandon it.

What is needed is a system and method for facilitating purchases on mobile devices with easier user identification, availability to complete the purchase without an active Internet connection and automatic compilation of payment request.

BRIEF DESCRIPTION OF THE INVENTION

The aim of present invention is to provide a system and method to facilitate purchases through mobile communications on various mobile devices including but not limited to smartphones, feature phones and tablet computers by reducing the number of steps it takes the user (for example the purchaser, buyer, end-client, shopper, etc) to complete the purchase with mobile in-app payments, and/or by enabling purchases to be made without the device being connected to the Internet and/or by automatic compilation of payment request.

A set of user identifying details is required in order to process a mobile purchase. The minimum set of details includes user's country, mobile carrier name and phone number. The usual way of obtaining those details is to ask them directly from the user using multiple steps. The advantage of the present invention from the user perspective is the ability to complete the purchase in fewer steps by automatic user details identification.

From another perspective most of existing mobile purchase technologies requires an accessible Internet connection in order to complete the purchase. Another advantage of the present invention from the user perspective is the ability to complete the purchase in case there is no Internet connection by embedding a specially formatted database file with the application of mobile device. This file contains instructions, technical parameters, identifiers and request templates, that are needed to complete a purchase.

Another advantage of present invention from user perspective is the automatic compilation of payment request. In traditional way of initiating a purchase from mobile device, user is asked to compile and send a payment request using SMS text message. With the help of present invention user is asked about initiating a payment using mobile device native user interface and compilation of payment request is done automatically. As a result, it takes less time and actions for the user to complete the purchase.

The advantage of the present invention from the merchant perspective is the increased simplicity of completing the purchase for the user. This leads to higher amount of purchases, less interrupted purchases and increased revenues.

In a first embodiment a systems and methods are used to facilitate purchases through mobile communications on various mobile devices including but not limited to smartphones, feature phones and tablet computers by eliminating the need of entering the MSISDN identifier by the purchaser.

MSISDN value is required to identify mobile subscriber and request a mobile billing transaction through carrier's infrastructure. A system consists of a data computing facility, which is connected to mobile carrier billing, short code and networking infrastructure and a plurality of converters to communicate and interface with a plurality of controllers for various types of mobile devices and platforms.

Respective controller communicates with respective operating system telephony component by using native system functionality and obtains Mobile Network Code (MNC) and Mobile Country Code (MCC) values. If code values are among the ones currently supported by data computing facility's existing mobile carrier billing connections, a text message to respective short code consisting of encoded device and purchase identification details is initiated and sent by respective controller through operating system's native messaging component. Once received by the short code, message is transported to data computing facility and decoded by respective converter. As a result, MNC, MCC and MSISDN values are obtained and can be used for initiating a transaction through carrier billing infrastructure.

From the user perspective the time-consuming step of MSISDN input is excluded from the purchase flow. The whole payment process is more smooth and effective without the risk of input errors. As a result, the process of purchase on mobile device it feels like an initial and built-in functionality of the handset provided by mobile operator.

Each converter is configured to communicate with a respective controller through a wireless communication protocol, supported on respective device including but not limited to UMTS, W-CDMA, HSPA, LTE, EDGE, GSM, GPRS, GSM Short Message protocol and IEEE 802.11. Selection of communication interface is performed automatically by interrogating with device's platform core component. Each controller is designed to interact with respective device's operating system native telephony and messaging component in order to determine Mobile Network Code (MNC) and Mobile Country Code (MCC) values based on device's operating system version. Device and purchase identification details are transmitted using operating system's native messaging component through SMS-PP protocol as a Mobile Originated (MO) short message service transfer. Mobile subscriber identification is performed by using Mobile Subscriber Integrated Services Digital Network Number (MSISDN) value according to ITU-T specification E.164. MSISDN value is obtained from Mobile Originated short message service transfer by short code gateway.

A systems and methods for facilitating the purchases through mobile communications on various mobile devices including but not limited to smartphones, feature phones and tablet computers by eliminating the need of entering the MSISDN identifier by the purchaser where the MSISDN value is required to identify mobile subscriber and request a mobile billing transaction through carrier's infrastructure.

A system comprising of a main cloud-stored data computing facility, which is connected to mobile carrier billing, short code and networking infrastructure and a plurality of converters to communicate and interface with a plurality of controllers for various types of mobile devices and platforms.

A system and method where a respective controller communicates with respective operating system telephony component by using native system functionality and obtains Mobile Network Code (MNC) and Mobile Country Code (MCC) values.

A system and method where the code values are among the ones currently supported by data computing facility's existing mobile carrier billing connections, a text message to respective short code consisting of encoded device and purchase identification details is initiated and sent by respective controller through operating system's native messaging component.

A system and method where when the purchase identification details are once received by the short code the message is transported to data computing facility and decoded by respective converter.

A system and method where as a result, MNC, MCC and MSISDN values are obtained and can be used for initiating a transaction through carrier billing infrastructure.

In a second embodiment a systems and methods are used to allow purchases through mobile communications on various mobile devices including but not limited to smartphones, feature phones and tablet computers without the need of an established and active Internet connection.

In order to make a mobile billing transaction, technical information including service short code, purchase id, and service code is required. In addition Network Code and Mobile Country Code values are used to check if respective operator is supported for mobile purchases. By default this information is requested from a remote server through an existing Internet connection (either mobile Internet of wireless Internet). In case there is no active Internet connection on respective device, purchase transaction is terminated. With the help of present invention, required information is available on all devices including the ones without an active Internet connection thus enabling purchases on all mobile devices.

Technology consists of a software controller and embedded technical information database file with the list of all service short codes, purchase ids, service codes and supported Network Code and Mobile Country Code values. Database file is included with the application on the stage of compilation. Once the purchase is initialized the database file is parsed by the software controller and Network Code and Mobile Country Code checks are performed. Is respective mobile carrier is supported by the billing provider, respective service short code, purchase id, and service code values are extracted and used for making a billing transaction.

If an active Internet connection is found by the software controller, an up to date version of the database file is downloaded from remote server.

From the user perspective respective solution allows making mobile purchases without the need of Internet connection for example when it's not available or while roaming, when it's expensive. Usual payment flow follows the process of purchase without the "Active Internet connection is required in order to complete the purchase" window.

Solution consists of embed database file, software controller and remote database server. Embeddable database file is structured according to XML 1.0 specification produced by the W3C and includes technical information including but not limited to country description, service short code, respective billing algorithm, Mobile Network Code (MNC), Mobile Country Code (MCC), ISO 4217 formatted currency name and price points supported in respective country. Software component is developed using platform's native software development kit and includes XML encoded database file parser, a MNC and MCC detector module that communicates with respective operating system telephony component and a remote server communication gateway for database file updates if an Internet connection is found. Communication with remote server is performed through HTTP protocol using any of accessible mobile communication protocols including but not limited to UMTS, W-CDMA, HSPA, LTE, EDGE, GSM, GPRS and IEEE 802.11.

A systems and methods which are used to allow purchases through mobile communications on various mobile devices including but not limited to smartphones, feature phones and tablet computers without the need of established Internet where In order to make a mobile billing transaction, technical information including service short code, purchase id, and service code is required.

A system and method where in addition Network Code and Mobile Country Code values are used to check if respective operator is supported for mobile purchases. A system and method where by default this information is requested from a remote server through an existing Internet connection (either mobile Internet of wireless Internet) and in case there is no active Internet connection on respective device, purchase transaction will be terminated.

A system and method comprising a computer software controller and embedded technical information database file with the list of all service short codes, purchase ids, service codes and supported Network Code and Mobile Country Code values whereas the database file is included with the application on the stage of compilation.

A system and method where the purchase is initialized the database file is parsed by the software controller and Network Code and Mobile Country Code checks are performed and is the respective mobile carrier is supported by the billing provider, respective service short code, purchase id, and service code values are extracted and used for making a billing transaction.

A system and method when an active Internet connection is found by the software controller an up to date version of the database file is downloaded from remote server.

In a third embodiment a systems and methods are used to enable and facilitate purchases through mobile communications on various mobile devices including but not limited to smartphones, feature phones and tablet computers by providing a user-friendly payment flow for end-user and pre-filling some or all of respective payment details required to complete the transaction.

A system consists of a main cloud-stored data computing facility, which is connected to mobile carrier billing infrastructure and a web component for end-user interaction.

In order to complete the purchase consumer needs to send a payment request via an SMS text message to a premium rate short code. Web component is accessed by the mobile web browser through existing Internet connection and is used by the end user for selecting the amount of respective transaction and obtaining instructions for sending the Premium SMS message. Purchaser's country is detected automatically using geolocation, as a result only these price points are listed, that are available in respective country. Once the price point is selected, a next screen with payment instructions is shown to purchaser. After clicking the "pay now" button, purchaser is forwarded to messaging application's new message screen. Short code and message text are pre-filled and in order to complete the purchase end-user presses Send button.

From the user perspective solution allows cross-platform mobile purchases in applications through an intuitive end-user experience and without the need of manually completing the payment request SMS message thus reducing time needed to complete the purchase and reducing the probability of input errors.

Solution consists of a cloud-stored data computing facility and a web component for interaction with purchaser. Communication with computing facility is done using HTTP protocol. HTML5 technology based web component is accessed from Internetconnected applications or mobile browsers from a mobile device, such as a smartphone or tablet computer, connected to a wireless network. Component is optimized for mobile device displays with low resolution capability. Communication between computing facility and web component is performed using JSON formatted HTTML requests. After confirming the amount of purchase payment request details including service short code and request message text are transferred to messaging component of the device using native methods.

A system comprising a main cloud-stored data computing facility, which is connected to mobile carrier billing infrastructure and a web component for end-user interaction. A method where in order to complete the purchase consumer needs to send a payment request via an SMS text message to a premium rate short code, whereas the web component is accessed by the mobile web browser through existing Internet connection and is used by the end user for selecting the amount of respective transaction and obtaining instructions for sending the Premium SMS message. A method where a purchaser's country is detected automatically using geolocation, as a result only these price points are listed, that are available in respective country.

A method where once the price point is selected, a next screen with payment instructions is shown to purchaser and after clicking the "pay now" button, purchaser is forwarded to messaging application's new message screen, whereas a short code and message text are pre-filled and in order to complete the purchase end-user presses Send button.

A further development of the first, second and third embodiment of the present invention is an united system and method for facilitating purchases by automatic Mobile Network Code, Mobile Country Code and MSISDN detection and/or by enabling purchases without active Internet connection and/or by automatic compilation of payment request. The system and method comprises a mobile device component connected to the Internet, a web component, connected to the Internet, and a server component connected to the Internet and having a database component. Mobile device component is a further development of device controller, connected to device core platform. Server and database components are the further development of data computing facility, remote server and associated converters.

Mobile device component comprises a device controller, embedded database controller and purchase controller. Device controller is configured to: interface with the core system of mobile device; obtain device identification parameter values; interface with input and output components of the device including but not limited to display, keyboard, speaker, touchscreen. Embedded database controller is a further development of software controller and embedded technical information database from second embodiment and provides storing and retrieving purchasing instructions and payment request templates. Purchase controller plays the central role in managing the mobile purchase process. Purchase controller is configured to interface with: input and output components of mobile device; with other controllers of mobile device component; with web component; with data converter of server component.

Server component comprises a data converter, configured to exchange information between database component, web component and purchase controller of mobile device component.

Database component is configured to store and retrieve information including but not limited to purchase instructions, list of supported countries and operators and payment request samples.

Web component is configured to server mobile device optimized web pages containing purchase instructions and payment request samples.

In response to initialization of purchase by the user, purchase controller interfaces with device controller and obtains information about MNC, MCC, MSISDN values and whether a network connection is available.

In case a network connection is available, purchase controller sends user identification details including MNC, MCC and MSISDN values to data converter of server component. Data converter interfaces with database component and obtains a list of supported countries and mobile carriers. MNC and MCC values are converted to respective country and mobile carrier names and compared with the previously obtained list of supported countries and carriers. Comparison results are returned to device controller.

If country or mobile carrier of the user is not supported, purchase controller stops the purchase process and informs the user about not supported country or mobile carrier via mobile device display. If country and mobile carrier are among the supported ones, purchase controller interfaces with web component and obtains purchase instructions.

In case a network connection is not available, purchase controller interfaces with embedded database controller and obtains the list of supported countries and mobile carriers. Purchase controller converts MNC and MCC values to respective country and mobile carrier names and compares with the previously obtained list of supported countries and carriers.

If country or mobile carrier of the user is not supported, purchase controller stops the purchase process and informs the user about not supported country or mobile carrier via mobile device display. If country and mobile carrier are in the list of supported values, purchase controller obtains respective purchase instructions from embedded database controller.

Once purchase instructions are obtained, purchase controller launches native messaging application of mobile device and fills SMS short message payment request using the purchase instructions previously obtained from web component.

User is asked to confirm filled payment request and complete the payment by pressing the corresponding button (for example SEND button, complete or confirm the payment, etc) of native messaging application of mobile device. Purchase is completed.

In an alternative embodiment the present invention includes a method of updating purchasing instructions and payment request templates stored in embedded database controller. If an available network connection is detected by purchase controller, a latest copy of purchasing instructions and payment request templates is obtained from data converter and stored to embedded database controller.

In an alternative embodiment the present invention comprises a method of obtaining MSISDN value by the device controller in case such value is provided by operating system of the device. MSISDN value may be further used for identifying the user and facilitating the purchase process.

Other features will be apparent from the accompanying drawings and from the detailed description, which follows.

BRIEF DESCRIPTION OF THE DRAWINGS

The present invention is explained more precisely with references to figures added, where.

DETAILED DESCRIPTION OF THE INVENTION

Figure 1:
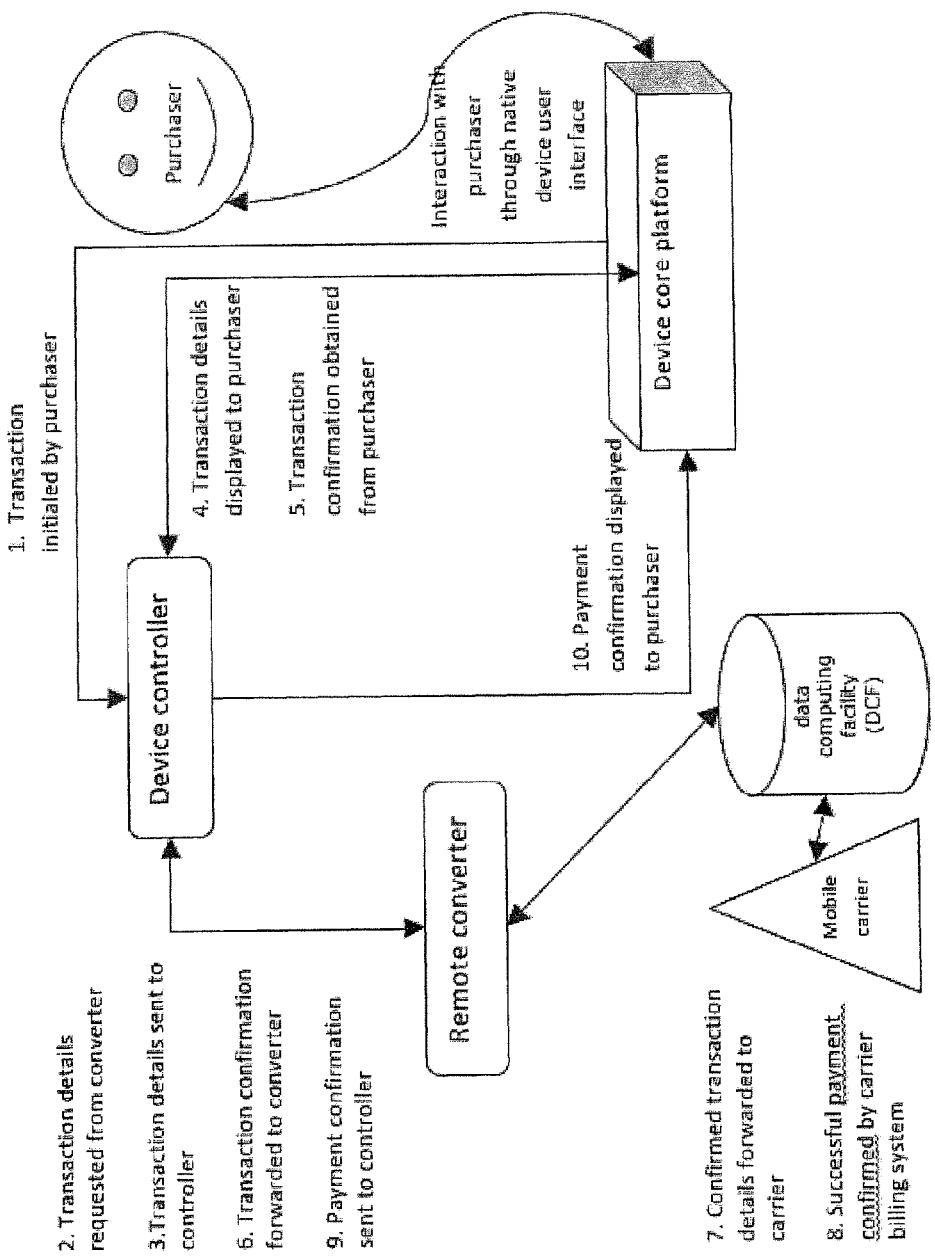
FIG. 1 depicts an illustrative system for facilitating purchases on mobile devices by automatic Mobile Network Code and Mobile Country Code detection according to the first embodiment.

For the purposes of promoting an understanding of the principles of the invention, reference will now be made to a number of illustrative embodiments illustrated in the drawings and specific language will be used to describe the same. The following description and drawings are illustrative and are not to be construed as limiting. Numerous specific details are described to provide a thorough understanding. However, in certain instances, well known or conventional details are not described in order to avoid obscuring the description.

The process of completing a purchase on mobile device comprises several steps and requires user authorization through detecting user's country, mobile carrier and phone number. Part of this information is obtainable directly from mobile device, bypassing the need of requesting this information from user. Country information can be obtained from Mobile Country Code (MCC) and carrier information can be obtained from Mobile Network Code (MNC) values in accordance with E.212 numbering standard by International Telecommunication Union.

Subscriber identification is performed using Mobile Subscriber Integrated Services Digital Network Number (MSISDN) value according to recommendation E.164 of ITU Telecommunication Standardization Sector.

A system according to present invention comprises at least one data computing facility, which is connected to mobile carrier billing infrastructure, short code and networking infrastructure and a plurality of converters to communicate and interface with a plurality of controllers for various types of mobile devices and platforms.

Each converter is configured to communicate with a respective controller through one of available wireless communication protocols (for example UMTS, W-CDMA, HSPA, LTE, EDGE, GSM, GPRS, GSM Short Message protocol, IEEE 802.11. etc) Selection of communication interface is performed automatically by interrogating with device's platform core component.

FIG. 1 shows a system to facilitate purchases on mobile devices by automatic Mobile Network Code, Mobile Country Code and MSISDN detection. In FIG. 1, a system comprises at least one data computing facility, which is connected to mobile carrier billing, short code and networking infrastructure and a plurality of converters to communicate and interface with a plurality of controllers for various types of mobile devices and platforms.

Figure 2:
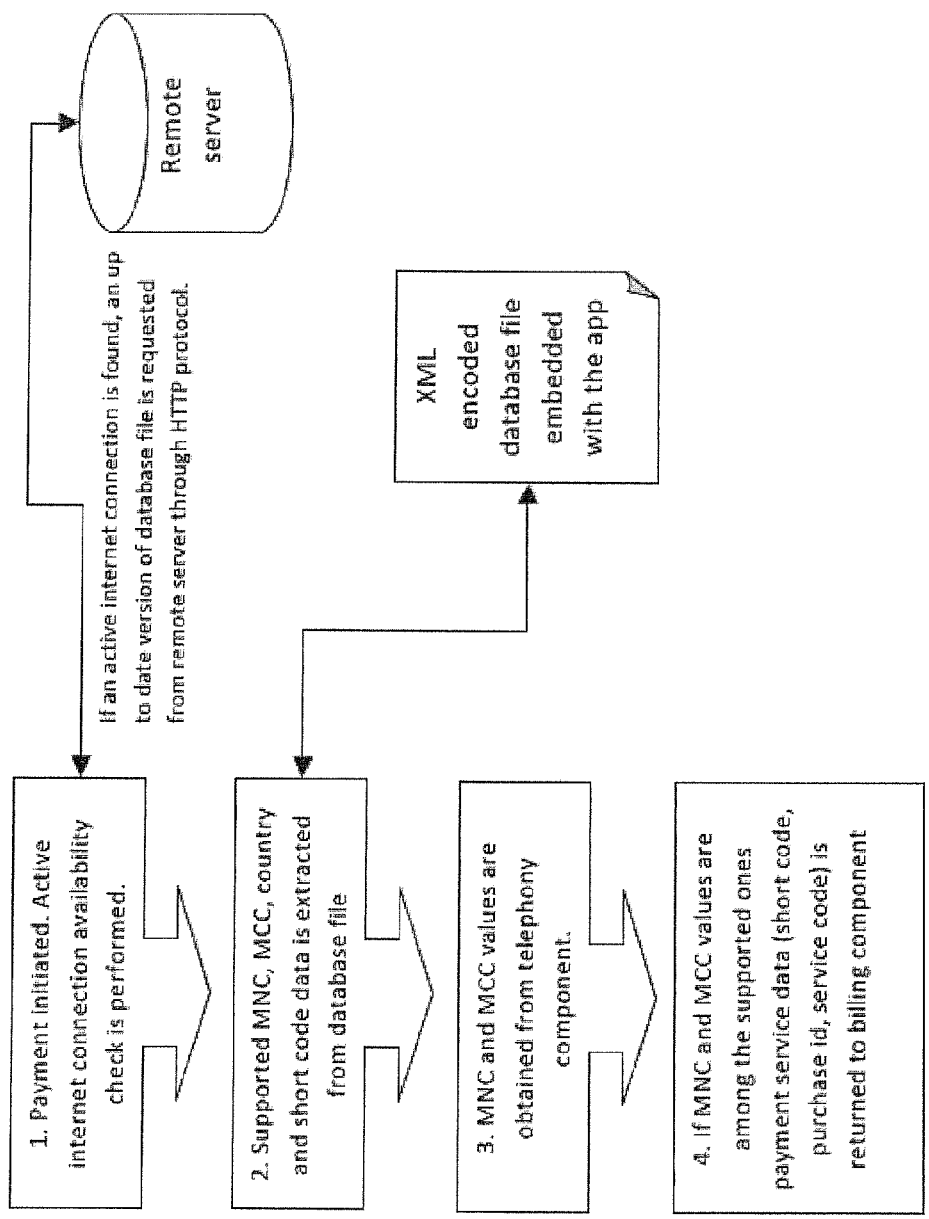
FIG. 2 depicts an illustrative method for purchases on mobile devices without an active Internet connection according to the second embodiment.

In FIG. 1. a method to facilitate cross-platform purchases on mobile devices in a first embodiment by MNC/MCC/MSISDN detection comprises following steps:
1. Transaction initiated by user
2. MNC and MCC values are sent to converter for coverage check
3. MNC and MCC values are checked with (Data Computing Facility) DCF coverage database
4. MNC and MCC support is confirmed by DCF to converter
5. MNC and MCC confirmation forwarded to controller
6. Encoded transaction details are sent via SMS text message to short code using messaging component
7. MSISDN value and transaction details are obtained by short code from incoming SMS text message and sent to DCF
8. Transaction details are decoded by DCF and sent to carrier billing system for making a MSISDN based transaction.
9. Transaction billing status is confirmed by carrier billing to DCF FIG. 2 shows a system to facilitate purchases on mobile devices without an active Internet connection according to second embodiment. In FIG. 2, a system comprises an embedded database file, software controller and remote server. Software controller is configured to interface with remote server and billing and telephony components of mobile device.

In FIG. 2. a method to facilitate purchases on mobile devices without an active Internet connection according to the second embodiment comprises following steps:
1. Payment initiated by user
2. Active Internet connection availability check if performed
3. If an active Internet connection is detected, a latest version of database file is downloaded from remote server
4. Supported MNC, MCC, country and short code data is extracted from database file
5. MNC and MCC values are obtained from telephony component of mobile device
6. Obtained MNC and MCC values are compared with supported list of values 7. If MNC and MCC values are supported, payment service data (short code, purchase id, service code) is returned to billing component.

Figure 3:
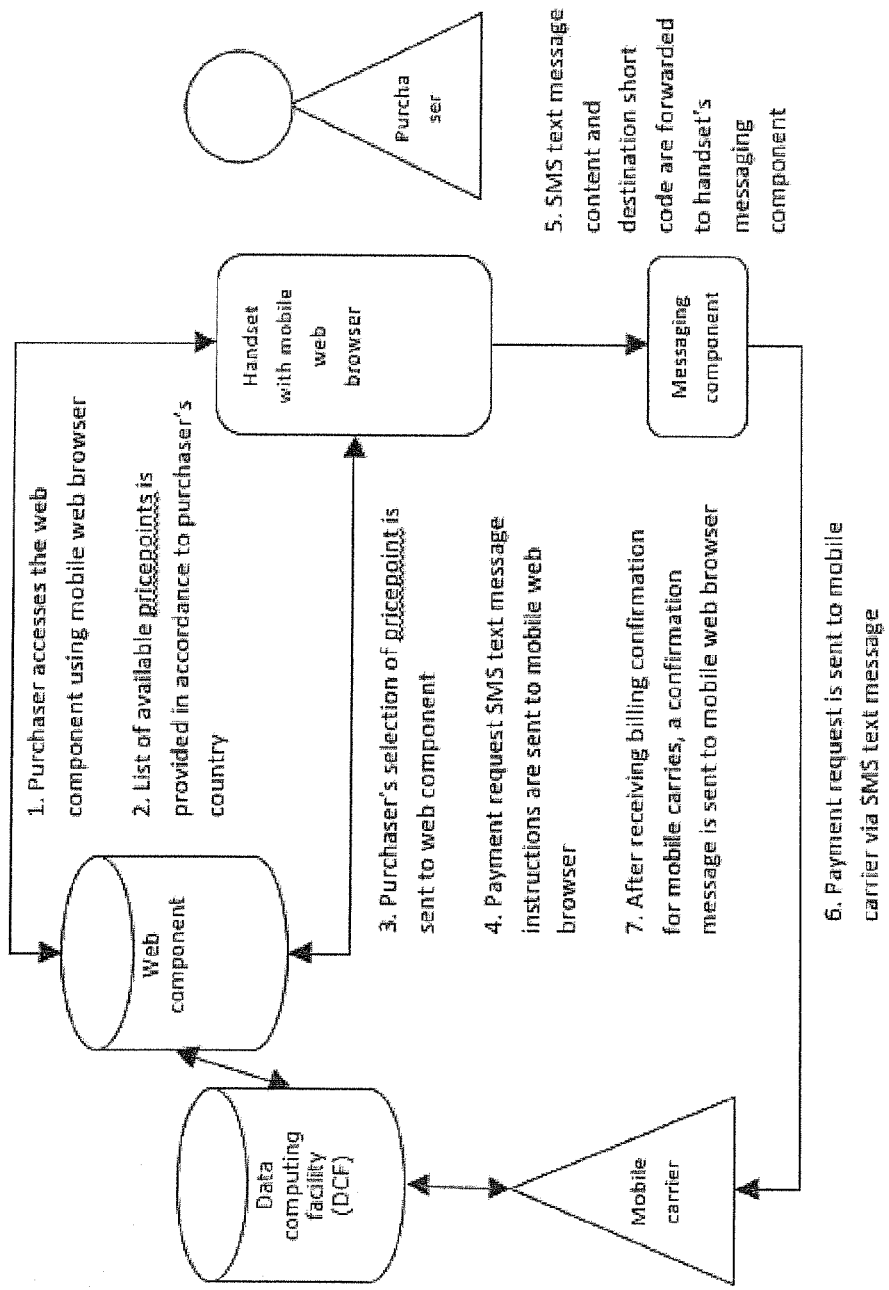
FIG. 3 depicts an illustrative system for facilitating purchases on mobile devices by automatic compilation of payment request according to the third embodiment.

FIG. 3 shows a system to facilitating purchases on mobile devices by automatic compilation of payment request according to the third embodiment; In FIG. 3, a system comprises at least one data computing facility, which is connected to mobile carrier billing and networking infrastructure and a plurality of components including web, display and messaging components.

In FIG. 3. a method to facilitating purchases on mobile devices by automatic compilation of payment request according to third embodiment comprises following steps:

1. User initiates the purchase by communicating with web component using mobile web browser of mobile device.
2. Web component returns a list of supported products and prices to mobile web browser of mobile device
3. User selects the product and selected product's id is sent to web component by mobile web browser of mobile device.
4. Web component receives the product id and provides payment request instructions to mobile web browser of mobile device.
5. Payment request instructions are sent from mobile web browser to native messaging component of mobile device.
6. Messaging component prepares a SMS text message with payment request.
7. Payment request is sent to mobile carrier via a SMS text message.
8. Billing confirmation is sent to mobile web component and displayed to the user via display of mobile device.

Figure 4:
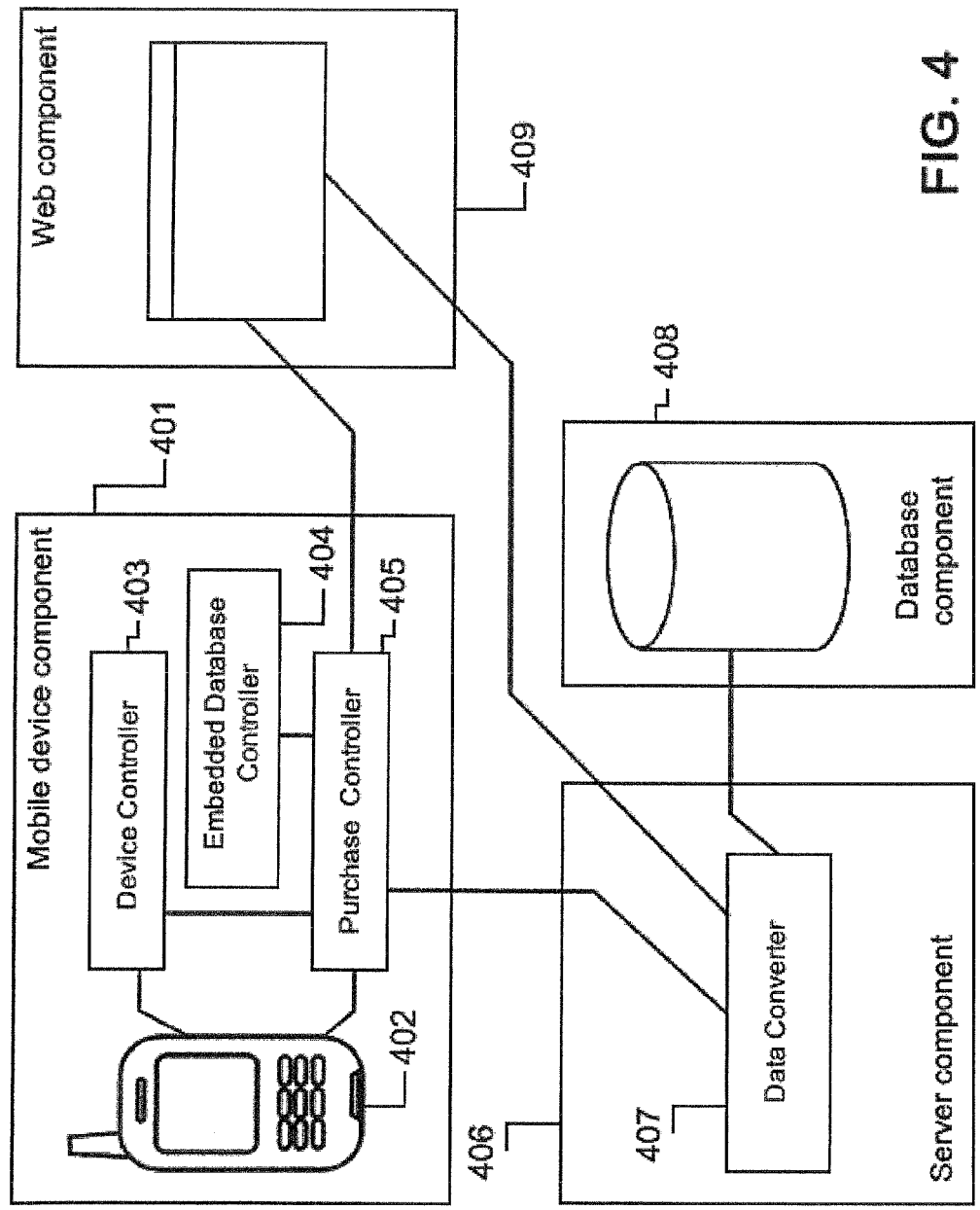
FIG. 4 depicts an illustrative system for facilitating purchases on mobile devices by automatic Mobile Network Code, Mobile Country Code and MSISDN detection and/or by enabling purchases without active Internet connection and/or by automatic compilation of payment request.

Referring to FIG. 4, an illustrative scheme of system for facilitating purchases on mobile devices by automatic Mobile Network Code, Mobile Country Code and MSISDN detection and/or by enabling purchases without active Internet connection and/or by automatic compilation of payment request is depicted in fourth embodiment. The system comprises a mobile device component 401 connected to the Internet, a web component 409, connected to the Internet, and a server component 406 connected to the Internet and having a database component 408. Mobile device component 401 is a further development of device controller, connected to device core platform. Server 406 and database components 408 are the further development of data computing facility, remote server and associated converters.

Mobile device component 401 comprises a device controller 403, embedded database controller 404 and purchase controller 405. Device controller is configured to: interface with the core system of mobile device 402; obtain device identification parameter values; interface with input and output components of the device including but not limited to display, keyboard, speaker, touchscreen. Embedded database controller 404 is a further development of software controller and embedded technical information database from second embodiment FIG. 2 and provides storing and retrieving purchasing instructions and payment request templates. Purchase controller 405 plays the central role in managing the mobile purchase process. Purchase controller is configured to interface with: input and output components of mobile device 402; with other controllers of mobile device component 401; with web component 409; with data converter 407 of server component 406.

Server component 406 comprises a data converter 407, configured to exchange information between database component 408, web component 409 and purchase controller 405 of mobile device component 401.

Database component 408 is configured to store and retrieve information including but not limited to purchase instructions, list of supported countries and operators and payment request samples.

Web component 409 is configured to server mobile device optimized web pages containing purchase instructions and payment request samples.

Figure 5:
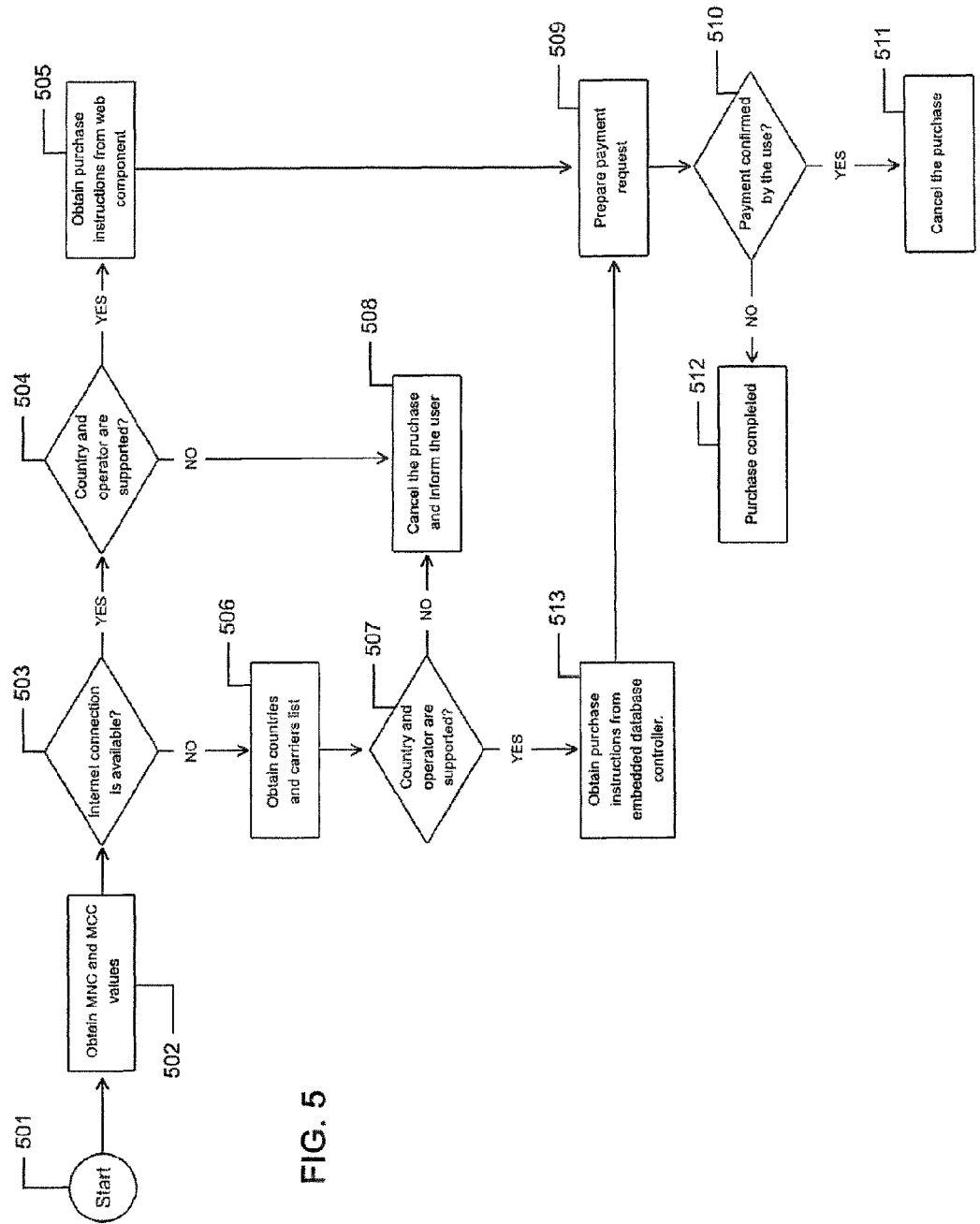
FIG. 5 depicts an illustrative method for facilitating purchases on mobile devices by automatic Mobile Network Code, Mobile Country Code and MSISDN detection and/or by enabling purchases without active Internet connection and/or by automatic compilation of payment request.

FIG. 5 shows a method for facilitating in-application purchases on mobile devices by automatic Mobile Network Code, Mobile Country Code and MSISDN detection and/or by enabling purchases without active Internet connection and/or by automatic compilation of payment request.

In response to initialization of purchase 501 by the user, purchase controller 405 interfaces with device controller 403 and obtains information 502 about MNC, MCC, MSISDN values and whether a network connection is available 503.

In case a network connection is available 503, purchase controller 405 sends user identification details including MNC, MCC and MSISDN values to data converter 407 of server component 406. Data converter 407 interfaces with database component 408 and obtains a list of supported countries and mobile carriers. MNC and MCC values are converted to respective country and mobile carrier names and compared 504 with the previously obtained list of supported countries and carriers. Comparison results are returned to device controller.

If country or mobile carrier of the user is not supported 504, purchase controller 405 stops the purchase process and informs the user about not supported country or mobile carrier via mobile device display 508. If country and mobile carrier are among the supported ones 504, purchase controller interfaces with web component 409 and obtains purchase instructions 505.

In case a network connection is not available 503, purchase controller 405 interfaces with embedded database controller 404 and obtains the list 506 of supported countries and mobile carriers. Purchase controller 405 converts MNC and MCC values to respective country and mobile carrier names and compares 507 with the previously obtained list of supported countries and carriers.

If country or mobile carrier of the user is not supported 507, purchase controller 405 stops the purchase process and informs the user about not supported country or mobile carrier via mobile device display 508. If country and mobile carrier are in the list of supported values 507, purchase controller 405 obtains respective purchase instructions 513 from embedded database controller 404.

Once purchase instructions are obtained 513, purchase controller 405 prepares payment request 509 by launching native messaging application 602 of mobile device and fills SMS short message payment request using the purchase instructions previously obtained from web component 409. User is asked to confirm filled payment request and complete the payment 510 by pressing the corresponding button (for example SEND button) of native messaging application of mobile device. If the button is pressed, purchase is completed 512. If CANCEL button is pressed or user exits messaging application, purchase is cancelled 511. In the event of user exiting the application or not making any activity within predetermined time at any of the steps before the purchase is completed, the purchase is automatically cancelled.

In an alternative embodiment the present invention includes a method of updating purchasing instructions and payment request templates stored in embedded database controller 404. If an available network connection is detected 503 by purchase controller 405, a latest copy of purchasing instructions and payment request templates is obtained from data converter 407 of server component 406 and stored to embedded database controller 404.

In an alternative embodiment the present invention comprises a method of obtaining MSISDN value by the device controller 403 in case such value is provided by operating system 402 of the device. MSISDN value may be further used for identifying the user and facilitating the purchase process.

Figure 6:
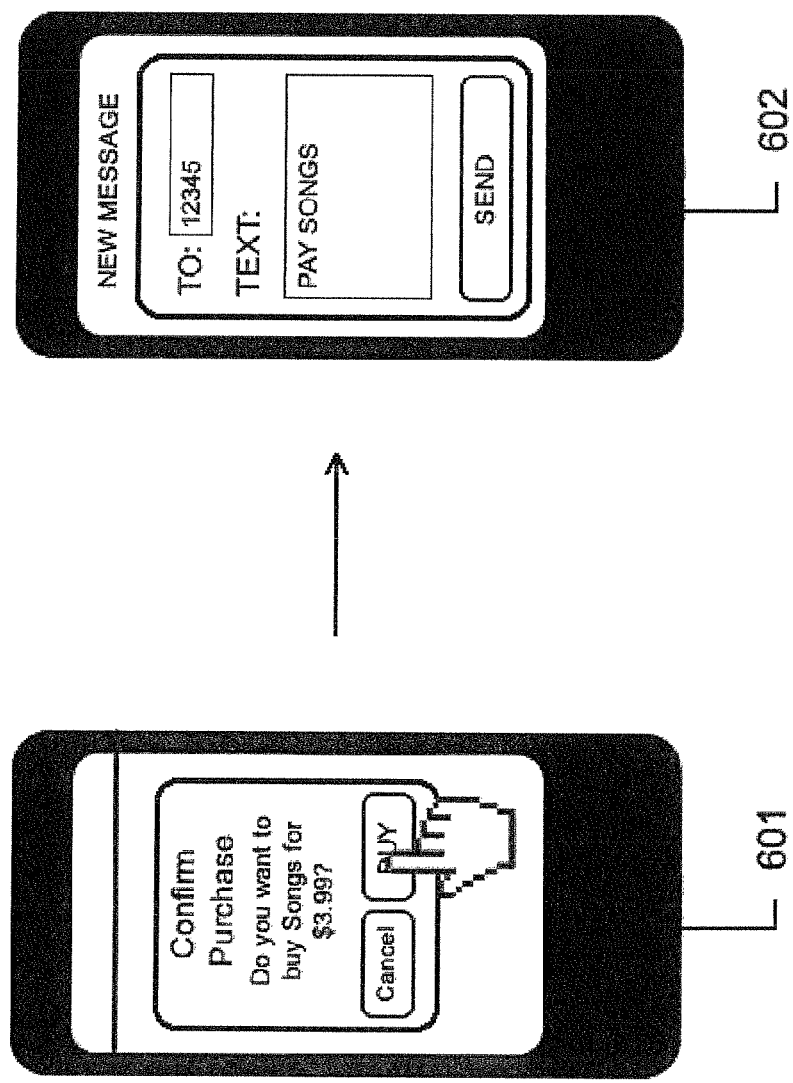
FIG. 6 depicts an illustrative example of method of automatic compilation of payment request.
Figure 7:
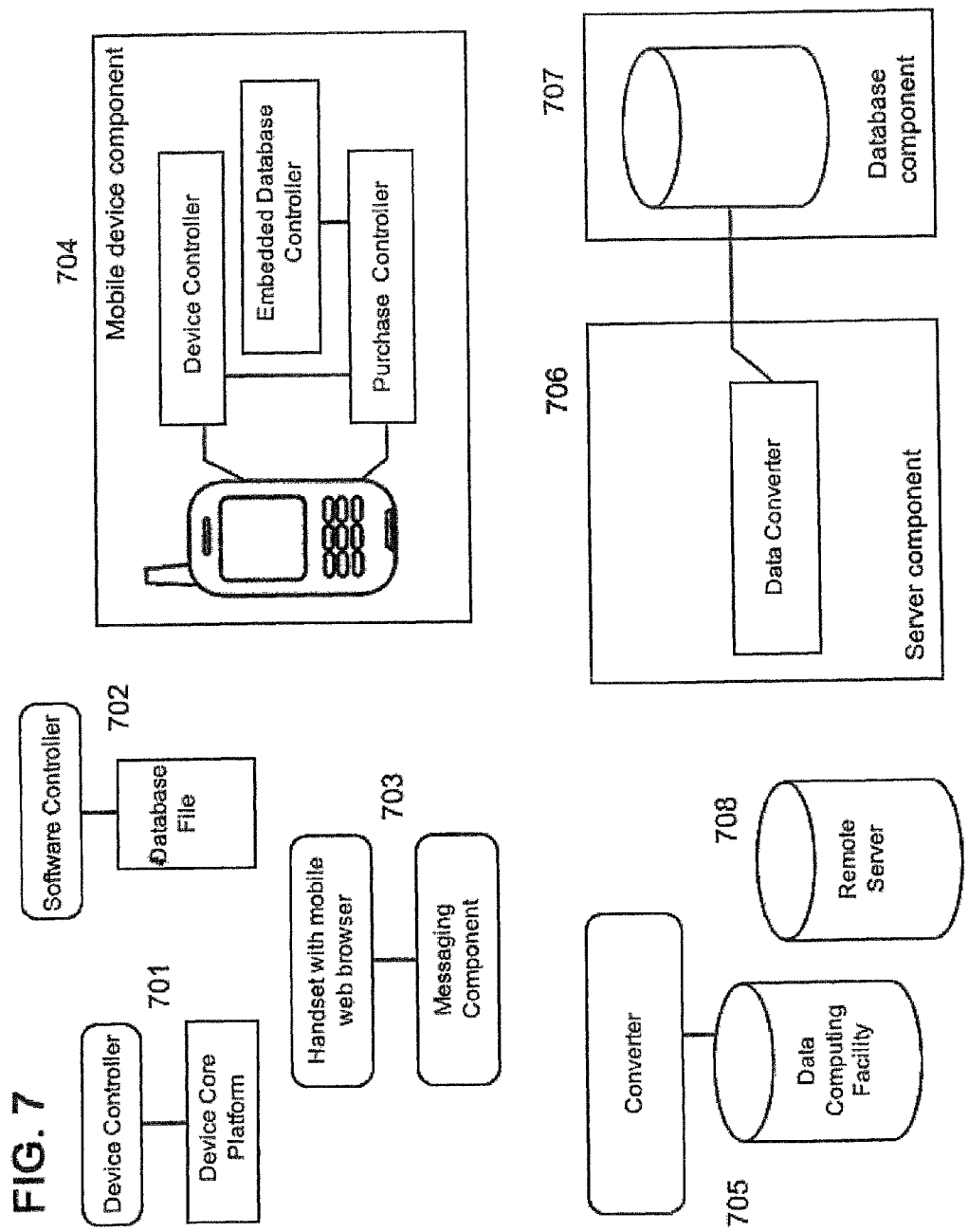
FIG. 7 depicts the fourth embodiment combining and integrating first, second and third embodiments.

In the illustrative embodiments 601 and 602 of FIG. 6 an illustrative example of method of automatic compilation of payment request 601 and prefilled payment request via messaging application of mobile device 602.

Referring to FIG. 1, FIG. 2, FIG. 3 and FIG. 4, FIG. 7 depicts the fourth embodiment combining and integrating first, second and third embodiments of the present invention. Mobile device component 704 is a further development of device controller, connected to device core platform 701, software component, connected to database file 702 and handset with mobile web browser connected to messaging component 703. Server 706 and database components 707 are the further development of data computing facility with associated converters 705 and remote server 708.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

The invention claimed is:

1. A system to facilitate in-application purchases on mobile devices comprises a mobile device component connected to the network, a web component connected to the network, and a server component connected to the network and having a database component storing an in-application purchases technical information database, wherein the mobile device component comprises a device controller, an embedded database controller coupled to an embedded database file storing a local version of the in-application purchases technical information database, and a purchase controller; server component comprises a data converter, configured to exchange information between the database component, the web component and the purchase controller of the mobile device component
 and wherein a purchase process comprises the purchase controller interfaces with the device controller and obtains information about MNC, MCC, MSISDN values and information on whether an active internet connection is available and if the mobile device is roaming and when an active internet connection is not available or when the mobile device is roaming, the purchase controller converts MNC and MCC values to respective country and mobile carrier names and compares with a list of supported countries and carriers previously obtained from the embedded database controller and based on the comparison, the purchase controller stops the purchase process when the country or mobile carrier of the mobile device is not supported and the purchase controller obtains respective purchase instructions from the embedded database controller when the country or mobile carrier of the mobile device is supported.

2. The system of claim 1, wherein the mobile device includes a core system and wherein the device controller is configured to interface with the core system of the mobile device; obtain mobile device identification parameter values; interface with input and output components of the mobile device.

3. The system of claim 1, wherein the embedded database controller provides storing and retrieving purchasing instructions and payment request templates.

4. The system of claim 1, wherein the purchase controller manages the mobile device purchase process and is configured to interface with input and output components of the mobile device, other controllers of the mobile device component, the web component and the data converter of the server component.

5. The system of claim 1, wherein the web component is configured to provide mobile device optimized web pages containing purchase instructions and payment request samples.

6. A method to facilitate in-application purchases on mobile devices using a local version of an in-application purchases technical information database stored on and retrieved from a remote server, comprises steps of: initiating a purchase by a user using a mobile device; obtaining information about MNC, MCC, MSISDN values; checking an availability of a data connection to the remote server and checking whether the mobile device is roaming; and when a data connection is not available or when the mobile device is determined to be roaming, the mobile device converts MNC and MCC values to respective country and mobile carrier names and performs a comparison with a list of supported countries and carriers previously obtained; and based on the comparison, stops the purchase when the country or mobile carrier of the mobile device is determined to be not supported; and when the country or mobile carrier of the mobile device is determined to be supported, obtaining purchase instructions; preparing and conducting the purchase; confirming the purchase using the local version of the in-application purchases technical information database; wherein the local version of the in-application purchases technical information database includes an up to date version of the in-application purchases technical information database when the data connection is available; and wherein the local version of the in-application purchases technical information database includes a non up to date version of the in-application purchases technical information database when the data connection is not available.

7. The method of claim 6, wherein a particular in-application purchase initiated by the user is a transaction or a payment.

8. The method of claim 6, wherein checking the availability of data connection comprises: checking active Internet connection availability.

9. The method of claim 6, wherein checking the availability of data connection comprises: returning a list of supported products and prices to a mobile web browser of a mobile device web component.

10. The method of claim 6, wherein obtaining purchase instructions comprises: forwarding MNC and MCC confirmation to a controller.

11. The method of claim 6, wherein obtaining purchase instructions comprises
 detecting an active Internet connection and downloading a latest version of a database file from a remote server;
 extracting supported MNC, MCC, country and short code data from the database file.

12. The method of claim 6, wherein obtaining purchase instructions comprises selecting a product by the user and the selected product's id is sent to a web component by a mobile web browser of the mobile device; receiving the product id by the web component and providing payment request instructions to the mobile web browser of the mobile device.

13. The method of claim 6, wherein obtaining purchase instructions further comprising obtaining the MSISDN value by a device controller from an operating system of the mobile device.

14. The method of claim 6, wherein preparing and conducting the purchase comprises: sending encoded transaction details via SMS text message to a short code using a messaging component; obtaining MSISDN value and transaction details by the short code from incoming SMS text message and sent to a Data Computing Facility (DCF).

15. The method of claim 6, wherein preparing and conducting the purchase comprises: sending a payment request instructions from a mobile web browser to a native messaging component of a mobile device; preparing a SMS text message with the payment request by the messaging component; sending the payment request to a mobile carrier via the SMS text message.

16. The method of claim 6, wherein preparing and conducting the purchase comprises updating purchasing instructions and payment request templates stored in an embedded database controller.

17. The method of claim 6, wherein confirming the purchase comprises: decoding transaction details and sending to a carrier billing system for making a MSISDN based transaction by a Data Computing Facility (DCF); confirming transaction billing status by carrier billing to the DCF.

* * * * *